United States Patent [19]

Hutchison et al.

[11] Patent Number: 5,162,626
[45] Date of Patent: Nov. 10, 1992

[54] SEAT SWITCH MUD FLAP ACTIVATOR INTEGRALLY MOUNTED TO THE SEAT

[75] Inventors: Wayne R. Hutchison, Mayville; Richard D. Teal, Horicon, both of Wis.; Steven C. Wasson; David R. Daniel, both of Midland, Mich.

[73] Assignee: Deere & Company, Moline, Ill.

[21] Appl. No.: 715,168

[22] Filed: Jun. 14, 1991

[51] Int. Cl.⁵ ............................................. H01H 3/02
[52] U.S. Cl. .................................................. 200/85 A
[58] Field of Search ............................. 200/85 R, 85 A

[56] References Cited

U.S. PATENT DOCUMENTS

| | | | |
|---|---|---|---|
| 2,794,089 | 5/1957 | Hogg et al. | 200/85 A |
| 3,736,729 | 6/1973 | Peterson | 56/10.5 |
| 4,198,092 | 4/1980 | Federspiel | 296/65 R |
| 4,361,741 | 11/1982 | Leskoverc | 200/85 A |
| 4,544,205 | 10/1985 | Molnar | 297/455 |
| 4,795,865 | 1/1989 | Howard | 200/85 A |
| 4,969,533 | 11/1990 | Holm et al. | 180/273 |

Primary Examiner—J. R. Scott

[57] ABSTRACT

A seat mechanism including a switch flap mechanism formed integrally with a first seat pan member made of a plastic material. When an operator sits on the first seat pan member, the switch flap deflects downwardly under the weight of the operator. The switch flap deflects downwardly to engage a plunger switch mounted with a second seat pan member. When the plunger switch is depressed the vehicle components are shifted to an operative mode. An operator presence function is thereby served.

8 Claims, 3 Drawing Sheets

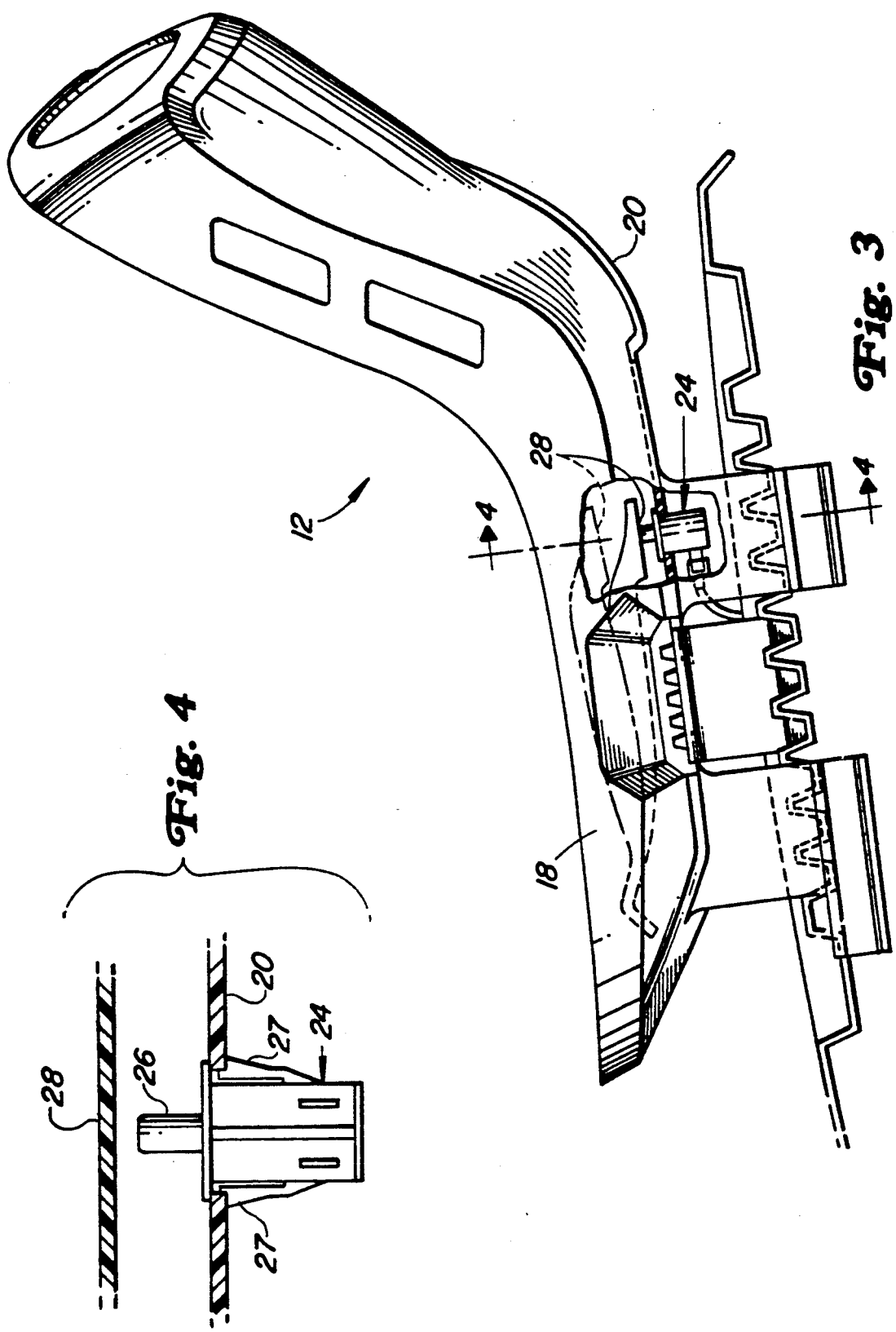

SEAT SWITCH MUD FLAP ACTIVATOR INTEGRALLY MOUNTED TO THE SEAT

BACKGROUND OF THE INVENTION

1. Field of the Invention

The invention relates to operator presence mechanisms coupled with a seat used with vehicles such as lawn and garden tractors.

2. Description of the Related Art

Many conventional vehicles are provided with a switch beneath the seat that serves as an operator presence device. The seats are often coupled with the vehicle via a hinge, and are held in a slightly raised position by a compression spring. A switch is typically positioned directly beneath the pivotable seat. When the operator puts his weight on the seat it will pivot downwardly and compress the spring. As the seat pivots downwardly, it activates the switch by pressing down a plunger. When the operator lifts his weight from the seat to dismount the vehicle, the seat will pivot upwardly due to the compression spring to release the plunger switch. The switch can act as a cut-off for a variety of different vehicle functions. For example, the switch can be coupled to the engine to stop ignition when the operator leaves the seat. The switch can also be coupled to a mower blade operated by the vehicle such that the blade stops rotating when the operator leaves the seat. The mechanisms that suspend the seat above the switch can include a relatively large number of parts and can therefore be relatively expensive to manufacture.

It would be desirable to provide a mechanism for engaging a shut-off switch such that certain vehicle functions are stopped when the operator gets off the seat. A switch engagement mechanism that includes only a relatively small number of parts would be desirable.

SUMMARY OF THE INVENTION

A seat mechanism is provided that is usable with a modes. A switch coupled with the vehicle has a disengaged mode wherein the vehicle is in an inoperative mode, and an engaged mode wherein the vehicle is in an operative mode. A first seat pan member is provided having a generally horizontal portion upon which the operator may sit, and is formed of a plastic material. A deflectable switch flap means is formed integrally with the horizontal portion of the first seat pan member for receiving a portion of the weight of the seated operator. The switch flap means is positioned adjacent the switch for shifting the switch from the disengaged to the engaged mode when the switch flap means deflects under the weight of the operator. A support means supports the first seat pan member above the frame, and is formed of plastic material.

BRIEF DESCRIPTION OF THE DRAWINGS

FIG. 3 is a side view of the seat with the switch and mounting area cut away for clarity.

FIG. 4 is an enlarged side view of the switch and its seat mounting, taken along line 4—4 of FIG. 3.

DESCRIPTION OF THE PREFERRED EMBODIMENT

Figure 1:
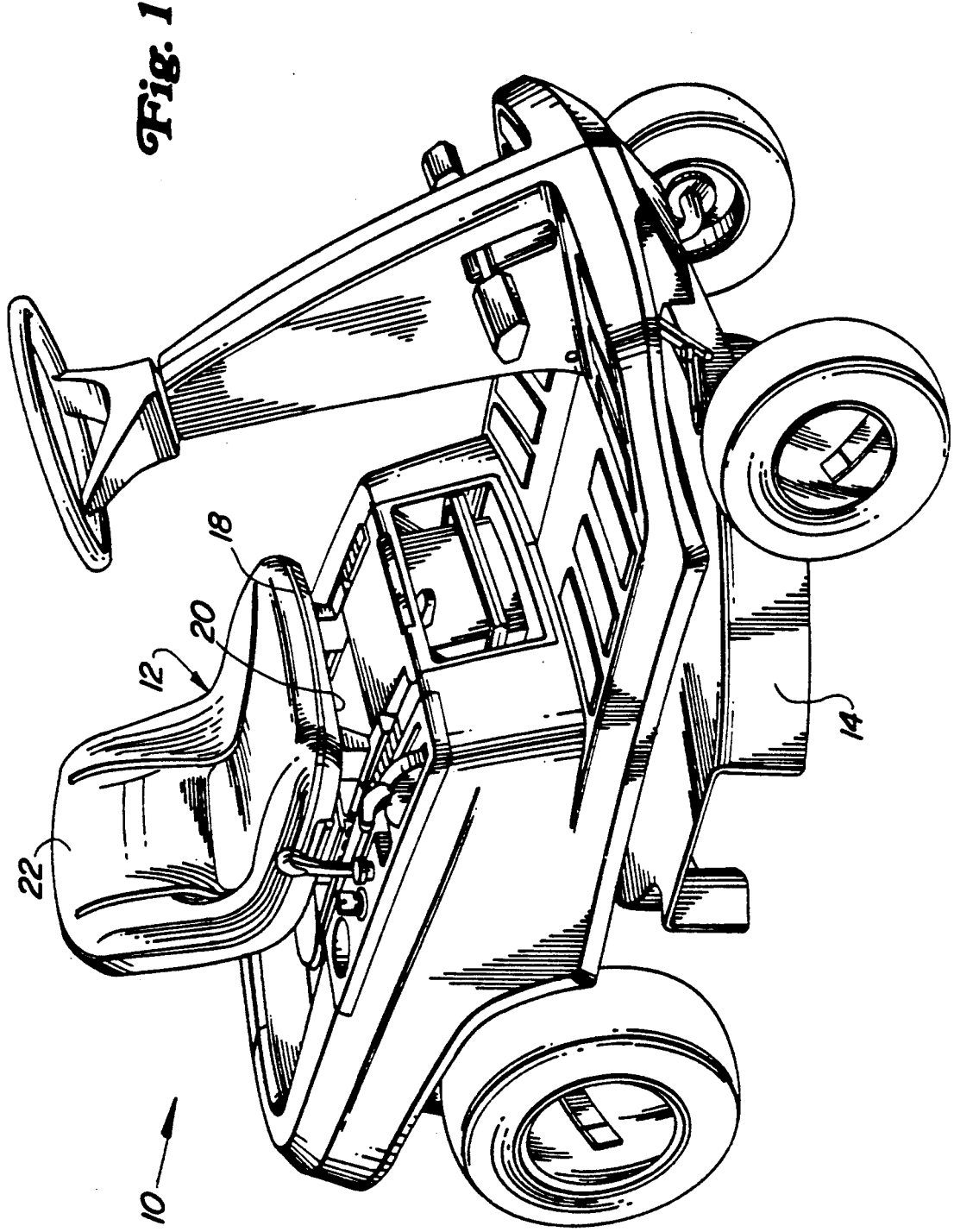
FIG. 1 is a front elevated perspective view of a lawn and garden vehicle and the seat equipped with the seat switch invention.

Referring to FIG. 1, there is shown a vehicle 10 with which the seat mechanism 12 according to the preferred embodiment of the present invention may be used. The vehicle 10 is adapted for use as a mower, and carries a power source such as an engine, and a mower housing 14 within which a cutter blade is rotatably driven by the power source.

Figure 2:
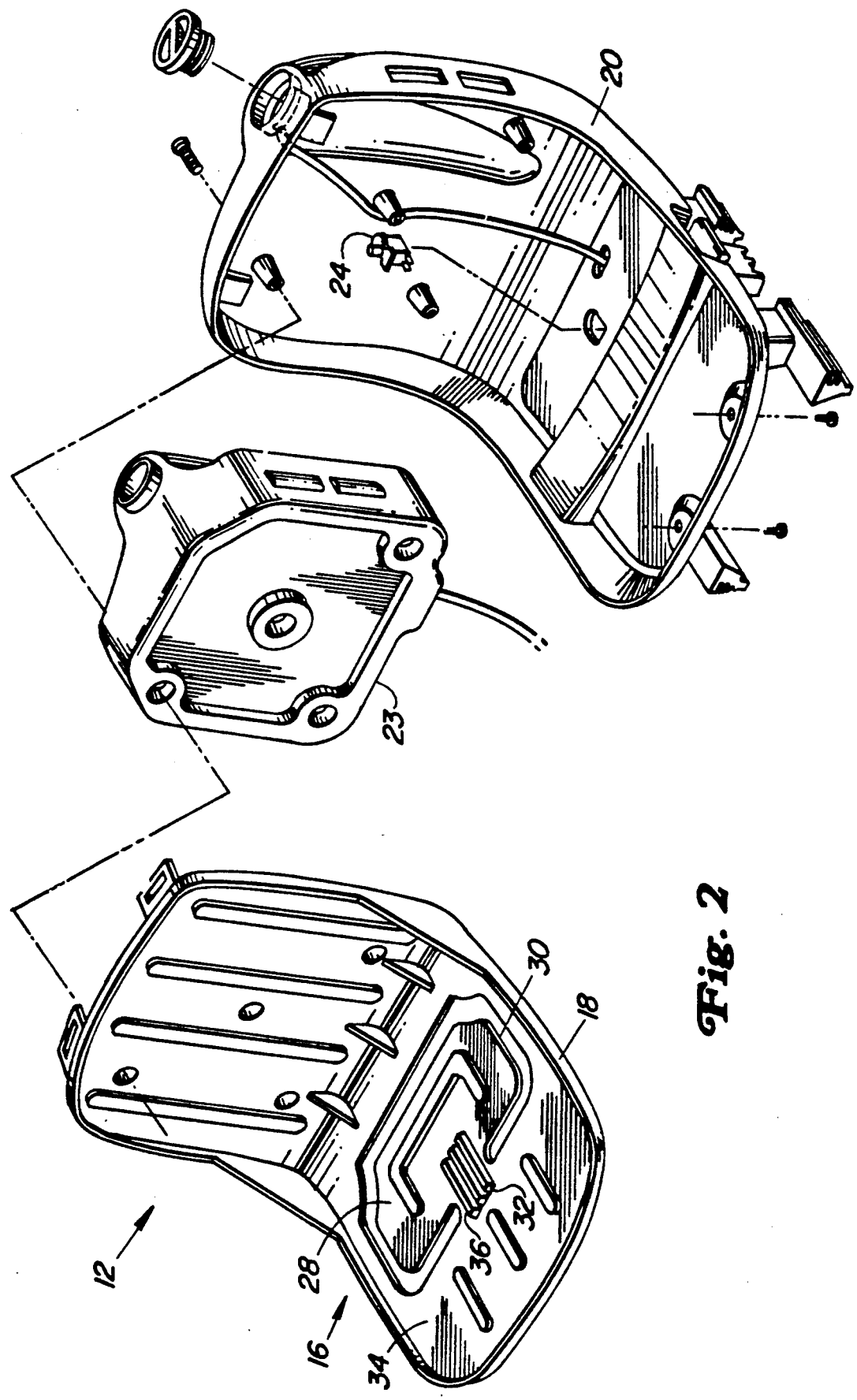
FIG. 2 is an exploded view of the seat and switch structure.

The switch activation mechanism 16 according to the preferred embodiment is illustrated in FIGS. 2-4. First and second seat pan members 18 and 20 made of injection molded plastic are shown that are coupled together during operation. A cushion 22 upon which the operator sits is coupled with the first seat pan 18. A gas tank 23 is shown in FIG. 2 carried between the up-right back portions of the first and second seat pan members 18 and 20. The second seat pan member 20 is positioned below the first seat pan member 18, and carries a switch 24 having a plunger mechanism 26. The switch 24 snaps in place and includes deflectable wing members 27, as best seen in FIG. 4, that are biased outwardly to secure the switch 24 against the first seat pan member 20. The switch 24 is electrically coupled with the engine, blade clutch, or other vehicle mechanisms for stopping various vehicle operations when in a disengaged mode. The switch 24 is shifted from an engaged mode to the disengaged mode by a deflectable switch flap means 28 formed in a generally horizontal portion 30 of the first seat pan member 18. When the operator sits on the generally horizontal portion 30 of the first seat pan 18, a portion of his weight will be positioned over the switch flap means 28. The switch flap means 28 will therefore deflect downwardly under the weight of the operator to depress the switch plunger 26. A bending portion 32 of the flap means 28 extends integrally between the first seat pan member 18 and the forward portion 34 of the switch flap means 28 for bending or flexing to allow the switch flap means 28 to deflect in response to the operator sitting on the seat 12. Reinforcing corrugations or ridges 36 are formed in the bending portion 32 to add stiffness to the bending portion 32 to help the switch flap means 28 spring back to its undeflected position.

Next the operation of the preferred embodiment will be discussed. When an operator mounts the vehicle 10 he sits on the cushion 22 and thereby places his weight on the horizontal portion 30 of the first seat pan member 18. The switch flap means 28 formed in the first seat pan member 18 receives a portion of the operator's weight, and the bending portion 32 flexes under the load. The switch flap 28 therefore deflects downwardly and engages the plunger 26 to shift the switch 24 to its engaged mode. Vehicle components such as the mower blade or power source that are electrically coupled with the switch 24 assume an operative mode due to the switch 24 being depressed. When the operator dismounts the seat 12 by lifting his weight from the first seat pan member 18, the switch flap means 28 is allowed to flex upwardly due to the decrease in the load applied to it. The switch flap means 28 therefore becomes disengaged from the plunger 26 and allows the switch 24 to resume its disengaged mode. The vehicle components coupled with the switch 24 thereby assume an inoperative mode.

The switch flap 28 defines a relatively large area for receiving a portion of the weight of the seated operator. Furthermore, the switch flap extends a substantial distance laterally. Therefore, if the operator sits on the seat in an off-center fashion, a portion of his weight will press the switch flap 28 downwardly. The switch flap according to the present invention therefore provides an operator presence mechanism that is actuated even when the operator sits on the seat at a location somewhere other than in the middle or center of the seat.

During the manufacturing process the first seat pan member 18 is formed by the injection molding process with the switch flap means 28 formed integrally therewith. During operation, when the operator removes his weight from the seat 12 the switch flap means 28 will flex or spring back to its unflexed position. The switch flap 28 is therefore internally biased by the strength of the material to shift upwardly and out of engagement with the plunger 26. The reinforcing ridges 36 formed in the bending portion 32 add strength and stiffness to the bending portion 32 to thereby lengthen the working life of the switch flap means 28.

I claim:

1. A vehicle seat mechanism upon which an operator may be seated while operating a vehicle having operative and inoperative modes, comprising:
   a switch coupled with the vehicle and having a disengaged mode wherein the vehicle is in an inoperative mode, and having an engaged mode wherein the vehicle is in an operative mode;
   a first seat pan member coupled with the vehicle and on which the operator sits during operation of the vehicle, said first seat pan member having a generally horizontal portion upon which the operator sits; and
   a deflectable switch flap means formed integral with the generally horizontal portion of the first seat pan member for receiving a portion of the weight of the seated operator, said switch flap means being positioned adjacent the switch for shifting the switch from the disengaged to the engaged mode when the switch flap means deflects under the weight of the seated operator.

2. The invention of claim 1 wherein the switch includes a plunger means that is depressed as the switch flap means deflects downwardly to shift the switch to the engaged mode.

3. The invention of claim 1 wherein the switch flap means includes a bending portion that is formed integrally between the first seat pan member and the switch flap means for bending to allow the switch flap means to deflect in response to an operator sitting on the first seat pan member.

4. The invention of claim 3, wherein the first seat pan member and switch flap means are formed of a plastic material.

5. The invention of claim 3, wherein the switch is mounted to a second seat pan member which is positioned beneath the first seat pan member.

6. The invention of claim 3 wherein the bending portion extends forwardly from a forward portion of the switch flap means to join the first seat pan member.

7. The invention of claim 3, and further comprising reinforcing ridge means formed in the bending portion for reinforcing the strength of the bending portion.

8. A vehicle seat mechanism upon which an operator may be seated while operating a vehicle having operative and inoperative modes, comprising:
   a switch coupled with the vehicle and having a disengaged mode wherein the vehicle is in an inoperative mode and an engaged mode wherein the vehicle is in an operative mode, said switch including a plunger means that is depressible to shift the switch to the engaged mode;
   a first seat pan member coupled with the vehicle and on which the operator sits during operation of the vehicle, said first seat pan member being formed of a plastic material and having a generally horizontal portion upon which the operator sits; and
   a deflectable switch flap means formed integral with the generally horizontal portion of the first seat pan member for receiving a portion of the weight of the seated operator, said switch flap means being positioned adjacent the switch for shifting the switch from the disengaged to the engaged mode when the switch flap means deflects downwardly under the weight of the seated operator;
   a bending portion formed integrally between the first seat pan member and the switch flap means and extending forwardly from a forward portion of the switch flap means to join the first seat pan member for bending to allow the switch flap means to deflect in response to an operator sitting on the first seat pan member;
   a second seat pan member positioned beneath the first seat pan member, said second seat pan member having said switch mounted therewith; and
   reinforcing ridge means formed in the bending portion for reinforcing the strength of the bending portion.

* * * * *

UNITED STATES PATENT AND TRADEMARK OFFICE
CERTIFICATE OF CORRECTION

PATENT NO. : 5,162,626
DATED : November 10, 1992
INVENTOR(S) : Hutchison et al.

It is certified that error appears in the above-indentified patent and that said Letters Patent is hereby corrected as shown below:

On the title page, Item [54]:

Please delete title: "SEAT SWITCH MUD FLAP ACTIVATOR INTEGRALLY MOUNTED TO THE SEAT"

with correct title:-- SEAT SWITCH AND FLAP ACTUATOR INTEGRALLY MOUNTED TO THE SEAT --

Signed and Sealed this

Fourteenth Day of December, 1993

*Attest:*

BRUCE LEHMAN

*Attesting Officer*     *Commissioner of Patents and Trademarks*